(12) United States Patent
Nivlet et al.

(10) Patent No.: US 6,801,858 B2
(45) Date of Patent: Oct. 5, 2004

(54) METHOD FOR FACILITATING MONITORING, IN THE COURSE OF TIME, OF THE EVOLUTION OF PHYSICAL STATES IN AN UNDERGROUND FORMATION

(75) Inventors: Philippe Nivlet, Croissy (FR); Frédérique Fournier, Cormeilles en Parisis (FR)

(73) Assignee: Institut Francais du Petrole, Rueil Malmaison Cedex (FR)

(*) Notice: Subject to any disclaimer, the term of this patent is extended or adjusted under 35 U.S.C. 154(b) by 0 days.

(21) Appl. No.: 10/133,591

(22) Filed: Apr. 29, 2002

(65) Prior Publication Data
US 2002/0188406 A1 Dec. 12, 2002

(30) Foreign Application Priority Data
Apr. 30, 2001 (FR) .......................................... 01 05849

(51) Int. Cl.[7] ................................................ G01V 1/28
(52) U.S. Cl. .......................................... 702/14; 702/16
(58) Field of Search ...................................... 702/14, 16

(56) References Cited

U.S. PATENT DOCUMENTS 5,265,192 A * 11/1993 McCormack ................ 706/20
5,638,269 A * 6/1997 Fournier et al. .............. 702/14
6,052,651 A * 4/2000 Fournier ....................... 702/14

OTHER PUBLICATIONS

Burns, 4D Seismic Interpretive processing: Optimizing Differential Imaging for Reservoir Monitoring, Oct. 20–22, 1998, SPE 50668.*
Gawith et al., Model–Based Interpretation of Time–Lapse Seismic, Using Stochastic Matching, Jun. 11–15, 2001, EAGE 63rd Conference & Technical Exhibition.*

* cited by examiner

*Primary Examiner*—John Barlow
*Assistant Examiner*—Toan M. Le
(74) *Attorney, Agent, or Firm*—Antonelli, Terry, Stout & Kraus, LLP (57) ABSTRACT

A method for facilitating monitoring, in the course of time, of the evolution of the physical states of a zone of an underground formation such as a reservoir by using and interpreting 4D seismic data. The method uses seismic pattern recognition, more particularly a fuzzy discriminant analysis technique allowing to integrate the uncertainties on the seismic measurements in the interpretation. The uncertainties taken into account are evaluated on parts of seismic traces obtained during successive seismic surveys, corresponding to zones of the underground formation (outside the reservoir) where the physical states monitored have undergone no significant change. The invention is useful for monitoring of the evolution of a hydrocarbon reservoir during production.

28 Claims, 5 Drawing Sheets

METHOD FOR FACILITATING MONITORING, IN THE COURSE OF TIME, OF THE EVOLUTION OF PHYSICAL STATES IN AN UNDERGROUND FORMATION

BACKGROUND OF THE INVENTION

1. Field of the Invention

The present invention relates to a method for facilitating monitoring, in the of time, of the evolution of the physical states of an underground formation by and interpreting 4D seismic data.

2. Description of the Prior Art

Various aspects of the prior art are in the following publications:

Dumay, J., Foumier, F., 1988, "Multivariate Statistical Analyses Applied to Seismic Facies Recognition", Geophysics, 53, n°9, pp. 1151–1159;

Sonneland, L. et al, 1997, << Seismic reservoir monitoring on Gullfalks>>, The Leading Edge, 16, n°9, pp. 1247–1252;

Ross C. et al << Inside the Crossequalization Blackbox>>, The Leading Edge, 15 :11, 1996, pp. 1233–1240;

Kolmogorov A. N., 1950, *Foundation of the Theory of Probability*; Chelsea Publ. Co., New York;

Moore R. E., 1969, *Interval Analysis*: Prenctice-Hall, Englewood Cliffs;

Walley P., 1991, *Statistical Reasoning with Imprecise Probabilities*: Monographs on Statistics and Applied Probabilities n. 42, Chapman and Hall, London; as well as in patents French Patent 2,768,818 and U.S. patent application Ser. No. 09/949,930.

Seismic measurements are conventionally used to provide additional information, in relation to drilling data, on the variations of the subsoil formations: lithologic, petrophysical or fluid saturation variations. In particular, within the scope of hydrocarbon reservoir production, it has become quite frequent to record seismic measurements repeatedly and then to interpret the seismic measurement variations in connection with the saturation and pressure variations due to reservoir production phenomena. This interpretation is often carried out by means of statistical pattern recognition techniques allowing classification of the seismic events into various categories representing the different physical states of the reservoir. These approaches are for example described in the publication by Dumay, J., Fournier, F. (1988). Their application to the interpretation of repeated seismic surveys is for example described in the publication by Sonneland, L., et al. (1997).

One difficulty concerning interpretation of repeated (or 4D) seismic surveys is that the measurement is not perfectly repetitive. Thus, even in zones of the subsoil that are not affected by the production of the reservoir, and whose seismic response should remain unchanged in the course of time, seismic variations which only express the lack of reproducibility of the measurement are observed. Among the many causes, the variations of the seismic signal from one survey to the next, the variability of the acquisition noises between different surveys, the imprecise position of the pickups and of the seismic sources can be mentioned.

Despite extensive reprocessing efforts to homogenize the various measurement surveys before interpretation, by means of methods described in the aforementioned publication by Ross et al. (1996), a residual non-repeatability remains, which is not insignificant. Thus, at the level of the reservoir, part of the variation of the seismic response is due to this non-reproducibility of the measurement, the other part being of course related to the physical evolutions of the reservoir as a result of the production mechanisms.

It is therefore very important, in the interpretation of the 4D measurement, to take into account this uncertainty inherent in the measurement, and not related to the reservoir variations.

SUMMARY OF THE INVENTION

The method according to the invention facilitates identification of the changes, in the course of time, in the physical state of a first zone of an underground formation (a reservoir zone for example) from the changes detectable within a first time window on several seismic trace sets obtained respectively during successive seismic surveys, by taking account of the uncertainties on a certain number of descriptive seismic attributes, by reference to parts of the seismic traces of the various sets recorded in at least a second time window corresponding to at least a second zone of the underground formation (outside the reservoir) where the formation undergoes no significant physical state variation during the successive seismic surveys, wherein a discriminant analysis technique is used to classify seismic events located on the recorded traces into defined categories.

A fuzzy discriminant analysis technique, which is the object of the aforementioned patent U.S. patent application Ser. No. 09/949,930, is applied to the analysis of seismic events from the reservoir. The measurement uncertainties related to their imperfect reproducibility are first evaluated using jointly seismic observations of the various surveys, made outside the zone potentially affected by the production of hydrocarbons.

The method comprises:

forming a learning base comprising physical states that have already been recognized and classified into predetermined categories, each one being defined by attributes of known statistical characteristics, constructing, by reference to the learning base, a classification function using a discriminant analysis technique, allowing distribution in the categories the various seismic events to be classified from available measurements on a certain number of attributes, this function being formed by determining the probabilities of belonging of the events to the various categories by taking account of uncertainties on the attributes in form of probability intervals of variable width, and assigning each seismic event to at least one of the predetermined categories according to the width of the probability intervals.

The uncertainties involved in the construction of the classification function are here uncertainties expressing the lack of reproducibility of the seismic attributes from one seismic survey to the next, which are obtained by statistical analysis of the attribute variations of the seismic events of the second time window.

According to an implementation mode, the learning base is formed from seismic events measured in the vicinity of wells drilled through the formation studied, by defining therefrom learning classes corresponding to different rock types or to different fluid contents, the various objects to be classified being associated with seismic attributes covering the formation, and for which the probability of belonging to each of the defined learning classes is evaluated in form of an interval whose boundaries depend on the seismic attributes and on the uncertainties on the attributes, these objects being assigned to at least one of the learning classes according to the relative width of the associated probability interval in relation to all of the probability intervals.

The learning base can be formed by selecting for example the seismic traces in the parts which are the most representative of the different supposed physical states of the first zone, and of their variations, obtained for example with a numerical flow and production simulation model.

The learning base can also be formed according to the modes of a multivariate probability density function calculated from all of the seismic events characterized by the selected attributes.

According to an implementation mode, the uncertainties on the seismic attributes of the first zone are estimated from the variations of the vertical mean of the attributes variations of the various seismic surveys in the second time window.

It is also possible to estimate the uncertainties on the seismic attributes in the first zone from three-dimensional stochastic simulations in order to reproduce, for the first zone, the spatial variability and statistical characteristics such as the mean and/or the variance, estimated by geostatistical analysis of the variations of the attributes in the various seismic surveys in the second time window.

According to an implementation mode, the evolution with time of the states of a system is monitored by remote sensing.

If necessary, the method can comprise preprocessing of the seismic traces so as to eliminate, on the trace parts of the successive trace sets included in the second time window, differences other than those related to the changes in the shape of the objects.

Taking account of the 4D uncertainties in the interpretation process leads to categories of the physical state of the reservoir that may be no longer recognized if the uncertainty on the measurements is too great, or to several possible categories, non-detectable as a result of the uncertainty level. The interpretation of the repeated seismic data which is thus made integrates then completely the non-reproducible aspect of this measurement type, and the random variations induced in the reservoir are no longer interpreted as physical variations of this reservoir.

BRIEF DESCRIPTION OF THE DRAWINGS

Other features and advantages of the method according to the invention will be clear from reading the description hereafter of a non-limitative example, with reference to the accompanying drawings wherein:

FIGS. 7 to 9 show the spatial extension of the reliable (gray) and uncertain (black) assignments for 3 different seismic facies (facies 1: FIGS. 7a to 7c, facies 2: FIGS. 8a to 8c and facies 6: FIGS. 9a to 9c), as well as the evolution of this interpretation for the three surveys.

DETAILED DESCRIPTION OF THE PREFERRED EMBODIMENTS

The seismic events to be classified have seismic parameters or attributes. For example, these parameters can be the succession of the amplitudes along the seismic window studied. These events are simultaneously extracted from the various records obtained from the repeated seismic survey, at the level of a target zone of the subsoil, or reservoir. The class definition methodology based on the fuzzy discriminant analysis comprises four stages:

I—Analysis of the Statistical Variability of the Seismic Attributes

The first stage analyzes the statistical variability of the seismic attributes between the recording operations of the 4D seismic survey, due to the imperfect reproducibility of the measurement in the course of time. On each seismic survey is considered a volume of data taken in the time window for which prior reprocessing of the data has been carried out, but far enough from the reservoir zone so that the variations observed cannot be attributed to the physical evolutions of the reservoir, related to the production mechanisms. The different seismic data volumes have a set of parameters or attributes that are used for classifying the seismic events. The variations, from one survey to the next, of the attributes considered on the events associated with all of these data, are then studied. A parameter is defined thereafter, which represents the variability as a function of time, and therefore of production, of the seismic attributes considered. This parameter may be, for example, the absolute or relative difference of seismic attributes between the various seismic surveys, for each time sample and each seismic event that constitute the measurement uncertainty analysis volume. The statistical characteristics and the spatial variability of this parameter representing the uncertainty are then described in order to be able to extrapolate between the uncertainty evaluation zone and the reservoir zone. For example, in case of a vertical stationarity of the uncertainty, the assumption is made that the seismic measuring error in the reservoir is also vertically stationary, and that the vertical mean calculated on the uncertainty evaluation zone is representative of the vertical mean of this error in the reservoir.

II—Definition of the Learning Classes

The second stage defines the learning classes to be used in the discriminant analysis. This stage is carried out by indicating, among all the surveys, the seismic events supposed to be representative of the various classes of the reservoir studied.

Various methods can be used therefore. Two of them are mentioned hereafter by way of example.

A first possibility extracts the seismic events recorded in the vicinity of wells, whose geologic interpretation (and the evolution in the course of time of this interpretation) has been carried out. This methodology then allows classification all of the seismic traces according to geologic variations observed in the wells. A second possibility uses the assumed physical state variations of the reservoir, obtained for example with a flow and production simulation model, and in extracting the seismic learning events from the zones that are the most representative of these assumed states. Another possibility carries out a non-supervised classification of the seismic events recorded during the various surveys at different times, and in using the classes thus formed as learning classes in the fuzzy discriminant analysis.

III—Calibration of a Fuzzy Classification Function

The third stage calibrates by fuzzy discriminant analysis a fuzzy classification function from the seismic events selected in the previous stage so as to represent the object classes considered, and the uncertainties related thereto, estimated in stage 1. The method used, is described in the aforementioned U.S. patent application Ser. No. 09/949,030, and hereafter for the sake of clarity, is therefore applied to the uncertain data.

In a broad sense, this method comprises constructing a function allowing classification of objects into predetermined categories. This function is elaborated from the statistical characteristics of the attributes describing already recognized objects (i.e. for which the belonging category is known), which form a learning set. The classification function thus constructed is based on the calculation of the probabilities of belonging of the objects to the various classes, considering the measurements of p attributes available on these objects. For example, a decision is made to assign the object to the category for which a belonging probability is the most probable. The uncertainties on the attributes are taken into account in form of an interval of possible variation of the measurement of each attribute on a certain object. The aim is to propagate these possible intervals, for the values of the various measurements, in the classification probabilities calculation. For each category considered, a probability interval is obtained instead of a probability of classifying the object into this category. The object can then be assigned for the moment that one of the probability intervals exceeds the others. Analysis of these probability intervals also allows evaluation of the quality of prediction of the learning categories, as well as the degree of separation of these categories provided by the attributes, while integrating the uncertainty on the experimental measurements of these attributes.

This fuzzy discriminant analysis method is based on a particular application of the concept of interval arithmetic, hereafter used to facilitate comprehension of the description.

The technique referred to as interval arithmetic is used, which is described in the aforementioned publication by Moore R. E., 1969, allows extending the usual mathematical operators to calculations on intervals. The aim is to provide a guaranteed frame for the results considering the input intervals. Thus, rules (1) hereafter define the extension of the arithmetic operations to two intervals x=[x−; x+] and y=[y−; y+].

$$\begin{cases} x+y = [x^- + y^-; x^+ + y^+] \\ x-y = [x^- - y^+; x^+ - y^-] \\ x \cdot y = [\text{Min}\{x^- \cdot y^-; x^- \cdot y^+; x^+ \cdot y^-; x^+ \cdot y^+\}; \\ \quad \text{Max}\{x^- \cdot y^-; x^- \cdot y^+; x^+ \cdot y^-; x^+ \cdot y^+\}] \\ \frac{1}{x} = \left[\frac{1}{x^+}; \frac{1}{x^-}\right] \\ \frac{x}{y} = x \cdot \frac{1}{y} \end{cases} \quad (1)$$

For any function f, Equation (2) defines its extension to the intervals, referred to as inclusion function $f_{[\ ]}$.

$$f_{[\ ]}(x) \supseteq \{y = f(x) | x \in x\} \quad (2)$$

Obtaining these inclusion functions generally poses no problem. Among these, the natural inclusion function is constructed using only calculation rules (1) and some additional definitions concerning the elementary functions. For example, Equation (3) defines the extension of the exponential:

$$\exp_{[\ ]}(x) = [\exp(x^-); \exp(x^+)]0 \quad (3)$$

However, the natural inclusion functions are generally not optimum insofar as inclusion (2) is not an equality. The objective of interval arithmetic is then to generate an inclusion function whose boundaries are as limited as possible.

To complete these basic definitions, an extension of the comparison operators to the intervals is defined which is equation 4.

$$x > y \Leftrightarrow x^- > y^+ \quad (4)$$

It should be noted that the latter definition allows comparison of disjointed intervals. Intervals that overlap one another are referred to as indissociable.

The concepts of interval arithmetic are applied in the fuzzy discriminant analysis method to frame probabilistic objects. Now, probability intervals cannot strictly verify axioms referred to as Kolmogorov axioms which define a probability and are published in the aforementioned document by Kolmogorov (1950). It is therefore necessary to generalize the probability theory to the intervals. This generalization is described by Walley in the aforementioned publication under the name of imprecise probability theory. The two principal axioms to be verified by an imprecise probability $p_{[\ ]}$ are reminded hereafter.

$p_{[\ ]}$ is a positive defined measurement, i.e., for any event A $$0 \leq p_{[\ ]}^-(A) \leq p_{[\ ]}^+(A) \leq 1; \quad (5)$$

$p_{[\ ]}$ verifies a coherence axiom, i.e., for any set of independent events $A_i$, there is a function p defined on this set of events, which verifies the Kolmogorov axioms, and such that, for all the $A_i$, $$p_{[\ ]}^-(A_i) \leq p(A_i) \leq p_{[\ ]}^+(A_i). \quad (6)$$

The object recognition method described hereafter is similar, broadly, to a discriminant analysis algorithm.

In the description below, one of the N predetermined categories is denoted by $C_i$. The jth learning interval of class $C_i$, consisting of a vector of p measurement intervals, is denoted by $x_{ij}=(x_{jt}^{(1)}; \ldots; x_{ij}^{(k)}; \ldots; x_{ij}^{(p)})$. The current interval of the attribute space is denoted by $x=(x^{(1)}; \ldots; x^{(k)}; \ldots; x^{(p)})$. Finally, $x^c$ denotes the center of any interval x.

The stages of the object recognition algorithm are:

III—1 Calculation of the Conditional Probability Densities $p_{[\ ]}(X/C)$

The probability density can be estimated using either a non-parametric method or a parametric method. In the first case, the advantage of the method is that it allows better identification of the structure of each learning class $C_i$. However, its use requires a sufficient size for learning class $C_i$ so as to allow reliable identification of this structure. In the opposite case, it is necessary to make an assumption on the structure of learning class $C_i$. This amounts to supposing that this class follows a predetermined $$p(x/C_i) = \frac{1}{(2\pi)^{P/2}|\Sigma|^{1/2}} e^{-\frac{1}{2}(x-\mu)^t \Sigma^{-1}(x-\mu)} \quad (7)$$

where $\mu$ represents the center of inertia of learning class $C_i$ and $\Sigma$ its variance-covariance matrix characteristic of its dispersion.

The extensions of the non-parametric method are successively described for estimating the probability density, then of the Gaussian parametric method defined by equation 7.

III—1a Non-Parametric Method

In the non-parametric method, the conditional density is estimated, for example by means of the kernel method. The aim is to apply to the intervals the formula for calculating the conditional probability density function by means of Epanechnikov's kernel method described in the aforementioned reference:

$$p_{[\ ]}(x|C_i) = \frac{1}{n_i h^P} \sum_{j=1}^{n_i} K_{[\ ]}\left(\frac{x - x_{ij}}{h}\right), \quad (8)$$

where h represents the height of the passband of the kernel, $n_i$ the size of learning class $C_i$. The kernel is written as follows:

$$K_{[\ ]}\left(\frac{x - x_{ij}}{h}\right) = \begin{cases} \frac{1}{2N_p}(p+2)\left(1 - \frac{\sum_{k=1}^{p}(x^{(k)} - x_{ij}^{(k)})^2}{h^2}\right) & \text{if } |x - x_{ij}| < h \\ 0 & \text{otherwise} \end{cases} \quad (9)$$

Each quadratic term of the sum is independent of the others. The expression of the lower and upper boundaries of these terms is $Q=(X^{(k)}-X^{(k)}ij)/h^2$.

$$\begin{cases} Q^- = \begin{cases} \frac{(x^{c(k)} - x_{ij}^{(k)-})^2}{h^2} & \text{if } x_{ij}^{(k)c} \leq x^{(k)c} \leq x_{ij}^{(k)-} - (x^{(k)c} - x^{(k)-}) + h \\ \frac{(x^{c(k)} - x_{ij}^{(k)+})^2}{h^2} & \text{if } x_{ij}^{(k)+} - (x^{(k)+} - x^{(k)c}) - h \leq x^{(k)c} \leq x_{ij}^{(k)c} \\ 1 & \text{otherwise} \end{cases} \\ Q^+ = \begin{cases} \frac{(x_{ij}^{(k)-} - x^{(k)-})^2}{h^2} & \text{if } x_{ij}^{(k)-} - (x^{(k)c} - x^{(k)-}) - \\ h \leq x^{(k)c} \leq x_{ij}^{(k)-} - (x^{(k)c} - x^{(k)-}) \\ 0 \text{ si } x_{ij}^{(k)-} - (x^{(k)c} - x^{(k)-}) \leq x^{(k)c} \leq \\ x_{ij}^{(k)+} + (x^{(k)+} - x^{(k)c}) \\ \frac{(x^{(k)+} - x_{ij}^{(k)+})^2}{h^2} & \text{if } x_{ij}^{(k)+} + (x^{(k)+} - x^{(k)c}) \leq \\ x^{(k)c} \leq x_{ij}^{(k)+} - (x^{(k)+} - x^{(k)c}) + h \\ 1 \text{ otherwise} \end{cases} \end{cases} \quad (10)$$

An equivalent calculation is carried out if another non-parametric estimator of the conditional density were used, such as the estimator of the k closest neighbours.

III—1b Parametric Method

Equation (7) can theoretically be extended by means of calculation rules (1), but their direct use leads to overestimation of the variation intervals of the probability densities of Equation (11).

$$p_{[\ ]}(x_{[\ ]}/C_i) = \frac{1}{(2\pi)^{P/2}|\Sigma_{[\ ]}|^{1/2}} e^{-\frac{1}{2}(x_{[\ ]}-\mu_{[\ ]})^t \Sigma_{[\ ]}^{-1}(x_{[\ ]}-\mu_{[\ ]})} \quad (11)$$

The calculation algorithm of the invention allows improvement of the frame that could be obtained by applying calculation rules (1). The various stages thereof are:

Calculation of the Variation Intervals of Parameters $\mu$ and $\Sigma$ of Gaussian Law (11)

This calculation finds the minimum and the maximum for each term of matrix $\Sigma$ when points $x_{ij}$ of learning class $C_i$ vary within their possible values interval $x_{ij}$. The calculation is carried out using an optimization method under constraint such as the projected gradient method.

$$\begin{cases} \Sigma_{kl}^- = \min_{x_{ij} \in x_{ij}, \forall j} \left\{ \sum_j (x_{ij}^{(k)} - \mu_i^{(k)})(x_{ij}^{(l)} - \mu_i^{(l)}) \right\} \\ \Sigma_{kl}^+ = \max_{x_{ij} \in x_{ij}, \forall j} \left\{ \sum_j (x_{ij}^{(k)} - \mu_i^{(k)})(x_{ij}^{(l)} - \mu_i^{(l)}) \right\} \end{cases} \forall (k,1) = 1 \ldots p \quad (12)$$

Diagonalization of the Interval Matrix $\Sigma_{[\ ]}$

This stage frames the interval matrix $\Sigma_{[\ ]}$ by a matrix $\Sigma^*_{[\ ]}$ that is similar thereto, but diagonal. In other words, $\Sigma^*_{[\ ]}$ must meet equation (13):

$$\Sigma^*_{[\ ]} \supseteq R_\theta{}^t \Sigma_{[\ ]} R_\theta \quad (13)$$

where $R_\theta$ is a rotation matrix.

The matrix $\Sigma_{[\ ]}$ is first modified by trying to convert it into a matrix $\Sigma'_{[\ ]} = R_\theta{}^t \Sigma_{[\ ]} R_\theta$ whose out-of-diagonal terms vary within intervals that are as small as possible. Jacobi's interval method is used. The out-of-diagonal intervals of $\Sigma'_{[\ ]}$ are then replaced by 0. This operation necessarily leads to an increase in the size of the variation intervals of the diagonal terms of $\Sigma'_{[\ ]}$.

In short, after this second stage, a frame is found for matrix $\Sigma_{[\ ]}$ in the form of a matrix $\Sigma^*_{[\ ]}$, for which interval repetition problems have been overcome. However, direct use of matrix $\Sigma^*_{[\ ]}$ in equation (11) still leads to overestimation of the variation intervals of the conditional probability densities.

Optimization of the Variation Intervals of the Conditional Probability Densities In order to better frame the variation interval of the conditional probability densities, the variation domain of $\mu$ is evenly divided into $n_s$ subdomains $\mu_{k[\ ]}$. In each subdomain $\mu_{k[\ ]}$ thus formed, interval arithmetic rules (1) are applied. This operation provides an interval function $p_{k[\ ]}(x/C_i)$. After forming the $n_s$ interval functions, the function $p_{[\ ](x/C_i)}$ is calculated which is the union of all the interval functions $p_{k[\ ]}(x_{[\ ]}/C_i)$ previously formed:

$$p_{[\ ]}(x/C_i) = \bigcup_k p_{k[\ ]}(x/C_i) \quad (14)$$

Function $p_{[\ ]}(x_{[\ ]}/C_i)$ thus calculated is a guaranteed frame for the variation intervals of the conditional probability density, but whose boundaries are better than if no subdomains had been formed.

After calculating the variation intervals of the conditional probability densities, the a posteriori probabilities $p_{[\ ]}(C_i/x)$ are calculated.

III—2 Calculation of the a Posteriori Probabilities $p_{[\ ]}(C_i/x)$

In this stage, to the intervals the well-known Bayes rule in statistics are applied:

$$p_{[\ ]}(C_i|x) = \frac{p(x|C_i) \cdot p(C_i)}{\sum_{i=1}^{p} p(x|C_i) \cdot p(C_i)_{[\ ]}} \quad (15)$$

By converting the previous equation and by applying rule (1), the optimum expression hereafter for the a posteriod probabilities is obtained:

$$p_{[\ ]}(C_i|x) = \left[\left(1 + \sum_{l \neq i} \frac{p^+(x|C_l) \cdot p^+(C_l)}{p^-(x|C_l) \cdot p^-(C_l)}\right)^{-1} ; \right.$$

$$\left. \left(1 + \sum_{l \neq i} \frac{p^-(x|C_l) \cdot p^-(C_l)}{p^+(x|C_l) \cdot p^+(C_l)}\right)^{-1}\right] \quad (16)$$

These interval probabilities verify the imprecise probability axioms.

III—3 Classification of Interval x in the Likeliest Class or Classes

The classification mode used here is an extension of the maximum likehood rule. It compares the various a posteriori probability intervals $p_{[\ ]}(C_i/x)$. The various intervals are thus first arranged in descending order of $p+(C_i/x)$ or, which is equivalent, in descending order of quantities $p+(x/C_i)p+(C_i)$:

$$p+(x|C_{i1})p+(C_{i1}) \geq p+(x|C_{i2})\ p+(C_{i2}) \geq \ldots \geq p+(x|C_{iN})p+(C_{iN}) \quad (17)$$

Then, by applying the rule of comparison on the intervals, it follows that, if intervals $p_{[\ ]}(C_{i1}/x)$ and $p_{[\ ]}(C_{i2}/x)$ are disjointed ($p-(C_{i1}/x) \leq p+(C_{i2}/x)$), interval x is assigned to class $C_{i1}$. In the opposite case, the algorithm cannot distinguish classes $C_{i1}$ and $C_{i2}$ at x. The previous comparison test is then repeated between classes $C_{i1}$ and $C_{i3}, \ldots, C_{i1}$ until intervals $p_{[\ ]}(x/C_{i1}) \cdot p_{[\ ]}(C_{i1})$ and $p_{[\ ]}(x/C_{i1}) \cdot p_{[\ ]}(C_{i1})$ are disjointed.

This stage allows calibration on the learning classes a classification function integrating the measurement uncertainties.

IV—Classification of the Seismic Events

Once this imprecise classification function is calibrated, it is used to classify the (also imprecise) seismic events of all the surveys. For each imprecise seismic event, the interval of possible variations of the probability of assignment to each class is calculated. According to the relative size of these various intervals, notably according to their possible overlap, the seismic event is assigned to a class set compatible with the measured attributes and the uncertainties related thereto.

V—Applications

Figure 1A:
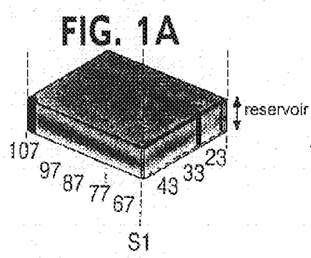
FIGS. 1a to 1c show three seismic amplitude volumes S1 to S3 recorded at three different periods in a reservoir whose production started between acquisitions S1 and S2.
Figure 1B:
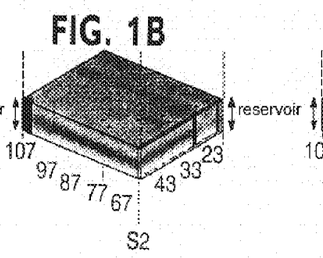
Figure 1C:
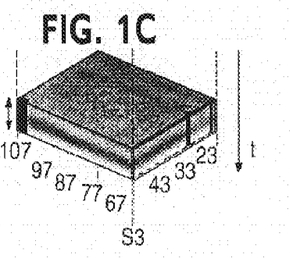

In order to monitor the physical changes in the reservoir related to the production mechanisms, three seismic surveys have been recorded: the first one before producing a reservoir, and the other two several months after production start. These changes are analysed within a constant time window shown in FIGS. 1a to 1c. The seismic events analysed are the seismic trace portions that can be extracted from each of these data volumes, and the attributes used to represent them are the amplitudes sampled over the 11 successive time intervals included in the reservoir window.

Figure 2A:
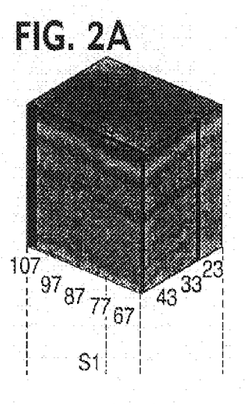
FIGS. 2a to 2c show, for each seismic survey performed, a seismic amplitude volume located above the formation studied, corresponding to a zone where no physical change related to the production of the reservoir has occurred, and used as a basis for estimating the seismic measuring error.
Figure 2B:
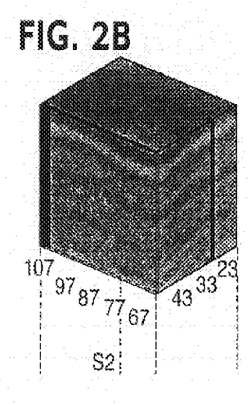
Figure 2C:
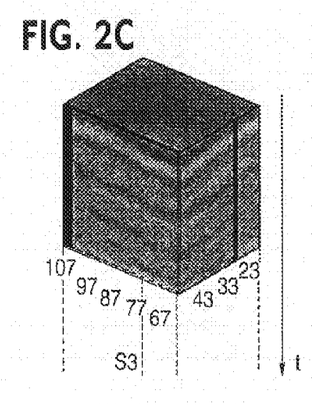

In order to estimate the uncertainties related to the lack of reproducibility of the data, a time window is extracted from the three seismic records located way above the reservoir, but in the zone that has been subjected to reprocessing before interpretation (FIGS. 2a to 2c). The amplitude measurement variations observed in this zone are not linked with the production mechanisms.

Figure 3:
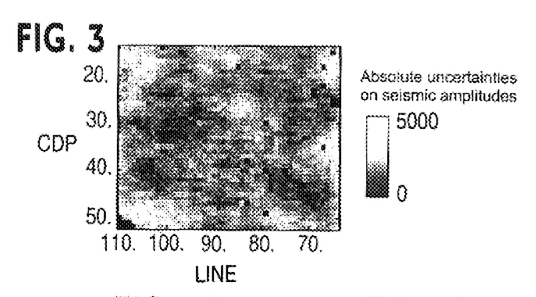
FIG. 3 shows the chart of the mean horizontal variations of the seismic amplitude measurement uncertainty, corresponding to the absolute amplitude differences observed between the three data volumes of FIG. 2.

The variations between FIGS. 2a to 2c are synthesized in FIG. 3, which represents the vertical mean of the maximum variation of the seismic amplitudes between the various surveys, and for each seismic event. In the illustrative example given, FIG. 3 is considered to represent the vertically stationary measurement uncertainty on each seismic amplitude for the whole data block (therefore including the reservoir window). This uncertainty varies laterally as shown in the chart of FIG. 3 (horizontal non-stationary).

Figure 4A:
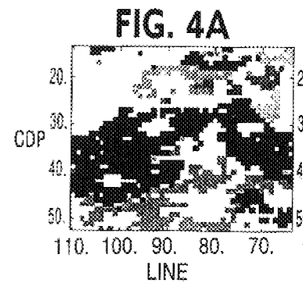
FIG. 4 shows the spatial distribution of the seismic traces selected to calibrate the imprecise classification function, coded according to their belonging class.
Figure 4B:
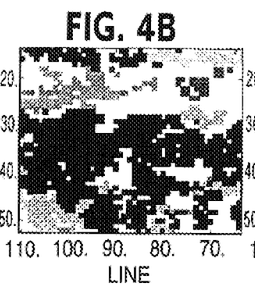
Figure 4C:
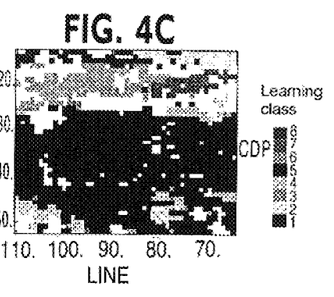

Once the measurement uncertainties are evaluated, the classes are defined from the analysis of the peaks of the multivariate probability density function calculated on all of the seismic traces of the three surveys. The seismic traces of higher probability density forming these peaks are then selected for learning of the classification function. FIG. 4 shows the spatial distribution of these learning seismic traces for the three surveys.

An imprecise classification function is then calibrated from the learning seismic traces of FIG. 4 bearing a measurement uncertainty shown in FIG. 3.

Figure 5A:
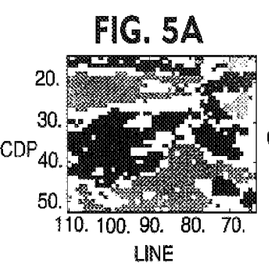
FIGS. 5a to 5c show the most reliable assignments of the seismic events of the three surveys of FIG. 1, considering the uncertainties shown in FIG. 3.
Figure 5B:
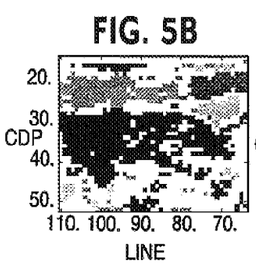
Figure 5C:
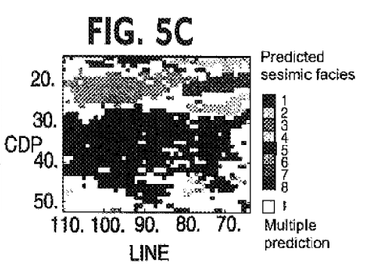
Figure 6A:
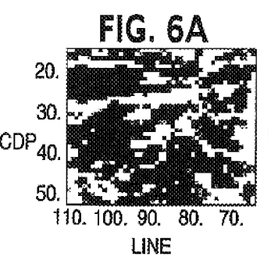
FIGS. 6a to 6c show, for these reliably assigned events, the uncertainty on the assignment probability associated with the classification.
Figure 6B:
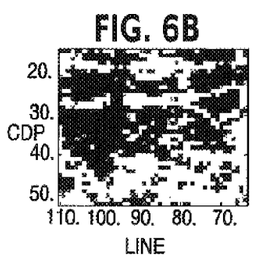
Figure 6C:
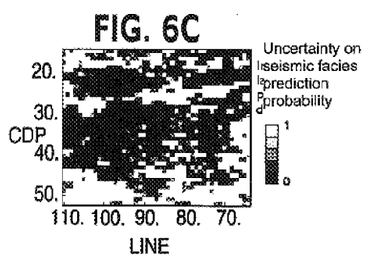
Figure 7A:
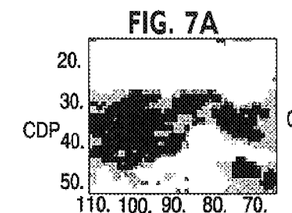
Figure 7B:
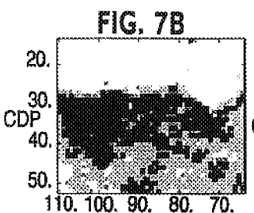
Figure 7C:
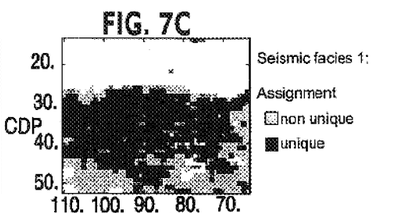
Figure 8A:
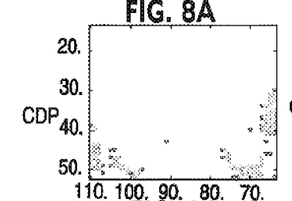
Figure 8B:
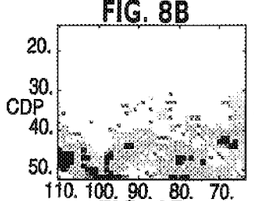
Figure 8C:
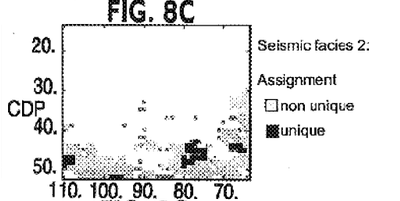
Figure 9A:
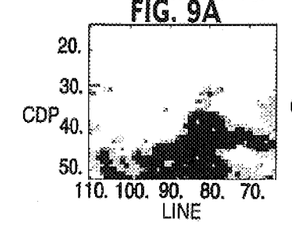
Figure 9B:
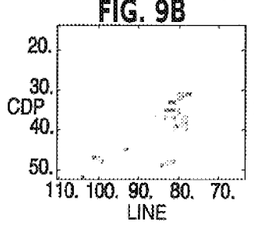
Figure 9C:
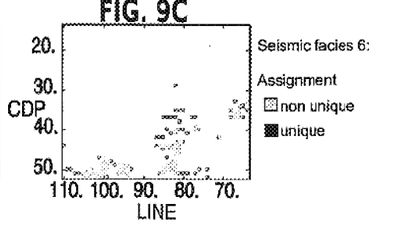

This function is applied in a last stage to interpret the change in the spatial distribution of the object classes previously defined in the reservoir. These changes will then be interpreted as physical changes related to the production mechanisms. FIGS. 5a to 5c show, for each survey, the assignments referred to as stable, i.e. the seismic events for which the measurement uncertainty has no effect on the classification result. These are all the points that are not coded in white. Globally, the majority of the seismic events are classified in a stable way. For the latter, the uncertainty on the corresponding classification probability is generally very low, as shown in FIGS. 6a to 6c, which reinforces the feeling of reliability of the classification. However, it can be seen in FIGS. 5b and 5c that the classification is uncertain (or non-single) in the southern part of the reservoir. If we observe more precisely the possible assignment charts for the various facies, it is seen that these points are classified either in class 1 or in class 2, as shown in FIGS. 7b and 7c, and in FIGS. 8b and 8c. On the other hand, it can simultaneously be seen that facies 6 (FIGS. 9b and 9c), which had been reliably located before production start (FIG. 9a), has disappeared. An interpretation of this result is that facies 6 disappears as a result of the production of the reservoir since the seismic characteristics of the zones where it was represented have evolved.

What is claimed is:

1. A method for facilitating identification of changes occurring, over time, in a physical state of a first zone of an underground formation, from changes detectable within a first time window of first sets of seismic traces respectively obtained during successive seismic surveys, by accounting for uncertainties of a number of seismic attributes, by accounting for uncertainties of a number of attributes, by reference to parts of traces of second sets of seismic traces recorded in at least a second time window corresponding to at least a second zone of the underground formation where the underground formation undergoes no significant physical state variation during successive sets of seismic traces, the method comprising:
   a) forming a learning base comprising physical states that have already been recognized and classified into categories, each physical state being defined by attributes of known statistical characteristics;
   b) obtaining uncertainties of the number of seismic attributes by statistical analysis of variations of seismic events of the second time window, the uncertainties being in a form of intervals of variable width expressing a lack of reproducibility of seismic attributes from one seismic survey to a next seismic survey of the second time window;
   c) constructing, an imprecise classification function in a form of probability intervals of variable width, using a discriminant analysis technique, and by reference to the learning base, the imprecise classification function allowing seismic events to be classified in the categories from available measurements based on the number of seismic attributes, while accounting for the uncertainties obtained by step b); and
   d) assigning each seismic event to at least one of the categories according to a width of the probability intervals.

2. A method as claimed in claim 1, wherein:
the learning base is formed from seismic events measured in a vicinity of wells drilled through the formation being studied, by defining therefrom learning classes corresponding to different rock types or different fluid contents, the seismic events being classified being associated with seismic attributes covering the formation and for which a probability of belonging to each of the learning classes defined is evaluated in a form of an interval having boundaries depending on the seismic attributes and on the uncertainties on the attributes, and the seismic events being assigned to at least one of the learning classes according to a relative width of an associated probability interval in relation to all of the probability intervals.

3. A method as claimed in claim 1, wherein:
the learning base is formed by selecting the seismic traces in parts which are the most representative of supposed different physical states of the first zone and of variations thereof.

4. A method as claimed in claim 3 wherein:
the variations are obtained by use of a numerical flow and production simulation model.

5. A method as claimed in claim 1, wherein:
the learning base is formed according to the modes of a multivariate probability density function calculated from all the seismic events described by selected attributes.

6. A method as claimed in claim 1, wherein:
uncertainties of the attributes of the first zone are estimated from variations of a vertical mean of a variation of the attributes in seismic surveys, in the second time window.

7. A method as claimed in claim 2, wherein:
uncertainties of the attributes of the first zone are estimated from variations of a vertical mean of a variation of the attributes in seismic surveys, in the second time window.

8. A method as claimed in claim 3, wherein:
uncertainties of the attributes of the first zone are estimated from variations of a vertical mean of a variation of the attributes in seismic surveys, in the second time window.

9. A method as claimed in claim 4, wherein:
uncertainties of the attributes of the first zone are estimated from variations of a vertical mean of a variation of the attributes in seismic surveys, in the second time window.

10. A method as claimed in claim 5, wherein:
uncertainties of the attributes of the first zone are estimated from variation of a vertical mean of a variation of the attributes in seismic surreys, in the second time window.

11. A method as claimed in claim 1, wherein:
uncertainties of the attributes of the first zone are estimated from variations of a vertical mean of a variation of the attributes in seismic surveys, in the second time window.

12. A method as claimed in claim 11 wherein:
the variability and statistical characteristic comprise mean and/or variance.

13. A method as claimed in claim 2 wherein:
uncertainties of the attributes of the first zone are estimated from three-dimensional stochastic simulations in order to reproduce, for the first zone, a spatial variability and statistical characteristics, estimated by geostatistical analysis of the attribute variations in the seismic surveys, in the second time window.

14. A method as claimed in claim 3 wherein:
uncertainties of the attributes of the first zone are estimated from three-dimensional stochastic simulations in order to reproduce, for the first zone, a spatial variability and statistical characteristics, estimated by geostatistical analysis of the attribute variations in the seismic surveys, in the second time window.

15. A method as claimed in claim 4 wherein:
uncertainties of the attributes of the first zone are estimated from three-dimensional stochastic simulations in order to reproduce, for the first zone, a spatial variability and statistical characteristics, estimated by geostatistical analysis of the attribute variations in the seismic surveys, in the second time window.

16. A method as claimed in claim 5 wherein:
uncertainties of the attributes of the first zone are estimated from three-dimensional stochastic simulations in order to reproduce, for the first zone, a spatial variability and statistical characteristics, estimated by geostatistical analysis of the attribute variations in the seismic surveys, in the second time window.

17. A method as claimed in claim 6 wherein:
uncertainties of the attributes of the first zone are estimated from three-dimensional stochastic simulations in order to reproduce, for the first zone, a spatial variability and statistical characteristics, estimated by geostatistical analysis of the attribute variations in the seismic surveys, in the second time window.

18. A method as claimed in claim 7 wherein:
uncertainties of the attributes of the first zone are estimated from three-dimensional stochastic simulations in order to reproduce, for the first zone, a spatial variability and statistical characteristics, estimated by geostatistical analysis of the attribute variations in the seismic surveys, in the second time window.

19. A method as claimed in claim 8 wherein:
uncertainties of the attributes of the first zone are estimated from three-dimensional stochastic simulations in order to reproduce, for the first zone, a spatial variability and statistical characteristics, estimated by geostatistical analysis of the attribute variations in the seismic surveys, in the second time window.

20. A method as claimed in claim 9 wherein:
uncertainties of the attributes of the first zone are estimated from three-dimensional stochastic simulations in order to reproduce, for the first zone, a spatial variability and statistical characteristics, estimated by geostatistical analysis of the attribute variations in the seismic surveys, in the second time window.

21. A method as claimed in claim 10 wherein:
uncertainties of the attributes of the first zone are estimated from three-dimensional stochastic simulations in order to reproduce, for the first zone, a spatial variability and statistical characteristics, estimated by geostatistical analysis of the attribute variations in the seismic surveys, in the second time window.

22. A method as claimed in claim 1, wherein:
the evolution over time of the states of a system is monitored by remote sensing.

23. A method as claimed in claims 2, wherein:
the evolution over time of the states of a system is monitored by remote sensing.

24. A method as claimed in claims 3, wherein:
the evolution over time of the states of a system is monitored by remote sensing.

25. A method as claimed in claims 4, wherein:
the evolution over time of the states of a system is monitored by remote sensing.

26. A method as claimed in claims 5, wherein:
the evolution over time of the states of a system is monitored by remote sensing.

27. A method as claimed in claims 6, wherein:
the evolution over time of the states of a system is monitored by remote sensing.

28. A method as claimed in claim 1, comprising:
preprocessing the seismic traces to eliminate, on trace portions of successive trace sets included in the second time window, differences other than differences related to changes in a shape of the seismic events.

* * * * *